US008625886B2

(12) United States Patent
Bart et al.

(10) Patent No.: US 8,625,886 B2
(45) Date of Patent: Jan. 7, 2014

(54) FINDING REPEATED STRUCTURE FOR DATA EXTRACTION FROM DOCUMENT IMAGES

(75) Inventors: Evgeniy Bart, Sunnyvale, CA (US); Prateek Sarkar, Sunnyvale, CA (US); Eric Saund, San Carlos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 201 days.

(21) Appl. No.: 13/022,877

(22) Filed: Feb. 8, 2011

(65) Prior Publication Data
US 2012/0201457 A1    Aug. 9, 2012

(51) Int. Cl.
*G06K 9/62* (2006.01)

(52) U.S. Cl.
USPC ............ 382/159; 382/155; 382/321; 382/305

(58) Field of Classification Search
USPC .................................. 382/155, 159, 321, 305
See application file for complete search history.

(56) References Cited

U.S. PATENT DOCUMENTS

| 2007/0280530 A1* | 12/2007 | Fung et al. | 382/159 |
| 2010/0253967 A1* | 10/2010 | Privault et al. | 358/1.15 |
| 2011/0078191 A1* | 3/2011 | Ragnet et al. | 707/780 |
| 2012/0203721 A1* | 8/2012 | Bart et al. | 706/13 |

OTHER PUBLICATIONS

Information extraction—structure., Sarkar et al., ACM, 978-1-60558-773-8, Jun. 9-11 2010, pp. 1-8.*
Information extraction—structure., Sarkar et al., ACM, 978-1-60558-773-8, Jun 9-11 2010, pp. 1-8.*
Design—tables., Silva et al., IJODA&R, 10.1007/s10032-005-0001-x, 2006, pp. 144-171.*
Y. Belaïd and A. Belaïd. Morphological tagging approach in document analysis of invoices. In ICPR, 2004.
C. Chow and C. Liu. Approximating discrete probability distributions with dependence trees. Information Theory, 14(11):462-467, 1968.
R. Fergus, P. Perona, and A. Zisserman. Object class recognition by unsupervised scale-invariant learning. In CVPR, Jun. 2003.
N. Friedman, D. Geiger, and M. Goldszmidt. Bayesian network classifiers. Machine Learning, 29:131-163, 1997.
H. Hamza, Y. Belaïd, and A. Belaïd. Case-based reasoning for invoice analysis and recognition. In Proceedings of the 7th International conference on Case-Based Reasoning, 2007.
T. Hassan. User-guided wrapping of pdf documents using graph matching techniques. In ICDAR, 2009.
B. Klein, S. Agne, and A. Dengel. Results of a study on invoice-reading systems in Germany. In DAS, 2004.
B. Klein, S. Gokkus, T. Kieninger, and A. Dengel. Three approaches to "industrial" table spotting. In ICDAR, 2001.
P. Sarkar and E. Saund. Perceptual organization in semantic role labeling. In Proceedings of 2005 Symposium on Document Image Understanding Technology, 2005.
P. Sarkar and E. Saund. On the reading of tables of contents. In DAS, 2008.
M. Weber, M. Welling, and P. Perona. Towards automatic discovery of object categories. In CVPR, 2000.

* cited by examiner

*Primary Examiner* — Jayesh A Patel
(74) *Attorney, Agent, or Firm* — Fay Sharpe LLP

(57) ABSTRACT

Methods and system employing the same for finding repeated structure for data extraction from document images are provided. A reference record and one or more reference fields thereof are identified from a document image. One or more candidate fields are generated for each of the reference fields. One or more best candidate records from the candidate fields are selected using a probabilistic model and an optimal record set is determined from the best candidate records.

19 Claims, 5 Drawing Sheets

FAY SHARPE
1228 Euclid Avenue
Cleveland, Ohio 44114
Ph: 316-363-9000
Fax: 216-363-9001

INVOICE

| DATE | INVOICE NO. |
|---|---|
| 11/20/10 | 111111 |

| BILL TO | SHIP TO |
|---|---|
| Joe Bloggs<br>1234 Wood Lane<br>Akron, Ohio 44313 | Joe Bloggs<br>1234 Wood Lane<br>Akron, Ohio 44313 |

| DESCRIPTION | QTY | RATE | AMOUNT |
|---|---|---|---|
| Printer | 2 | $100 | $200 |
| Computer | 1 | $300 | $300 |
| | | Total | $500 |

FIG. 2

FINDING REPEATED STRUCTURE FOR DATA EXTRACTION FROM DOCUMENT IMAGES

BACKGROUND

The present exemplary embodiments relate generally to document processing. They find particular application in conjunction with finding repeated structure within document images for data extraction, and will be described with particular reference thereto. However, it is to be appreciated that the present exemplary embodiments are also amenable to other like applications.

Many documents contain repeated structure. Forms, templates, and letterheads are examples of structure repeated across multiple documents. Layouts of headings, body text, and captions are examples of structure repeated across pages within a single document. Bulleted lists and tabular data are examples of structure repeated within a single page of a document. Prominent examples of the latter are invoices, receipts, and many healthcare forms. In these cases, instances of repeated structure of interest are called records. For example, in an invoice each record corresponds to a single product or service purchased. Records are composed of individual fields (such as 'unit price' or 'quantity'). These fields are laid out in a consistent (but unknown in advance) spatial structure.

Repeated structure conveys vital perceptual and semantic cues to a human reader. The relationships among the elements are encoded implicitly via the spatial structure. Identifying and extracting repeated structure is useful in a variety of applications. For example, product names extracted from an invoice can be matched to an database to verify receipt before remitting payment. As another example, in the healthcare domain, blood test results often describe each test performed. The results of these individual tests can be extracted, accumulated, and plotted as a function of time to display trends.

Despite its recognized value in business workflows, data extraction tasks suffer from inadequate or unreliable levels of automation. Consequently, data extraction is still largely done manually. However, the cost of manual data extraction can be quite high. For example, manually processing a single invoice can cost up to 9 Euro. For large businesses which can process tens of thousands of invoices per day, manual processing can dramatically increase the cost of operations. Accordingly, there is a strong need for a reliable, automatic approach to data extraction.

Automatic extraction of repeated structure from documents is a challenging task for a number of reasons. Variations in the content of individual fields induce significant variability in the structure. This variability includes changes in the field's visual appearance, as well as width and height. These changes, in turn, induce variations in the relative placement of other fields and in the presence and appearance of field separators. Many cues typically used for data extraction become difficult to exploit in these circumstances. For example, while whitespace gaps form a useful cue for field boundaries, they may be absent in some documents due to overlaps between different fields (interlacing). As another example, if different records occupy a different number of text lines, the periodicity structure will be disrupted as well, and the relative positions of different fields will not be consistent across items. When dealing with repeated structure across multiple documents, variations in the generation of these documents present an additional problem. For example, while the layout of a company's invoices may be centrally specified, local branches may deviate from this layout in different ways. Similarly, although standards governing the layout of medical claims forms exist, different hospitals deviate from this layout in unpredictable ways. In addition, variations and problems in the scanning process (such as paper slipping or other distortions) are also unpredictable, vary from document to document, and introduce an additional source of layout variability. All these difficulties make data extraction difficult to approach with shrink-wrapped automated solutions.

One approach to automatic data extraction is called 'wrapping'. In wrapping, one instance of the structure to be extracted is marked by a user. Subsequently, the approach 'wraps' (finds and extracts) additional instances of this structure. This wrapping is based on subgraph matching. The biggest drawback of this approach is that it does not learn from the annotation specified by the user. Instead, the user manually specifies the conditions for subgraphs to match. This requires significant effort and technical expertise. In addition, the specific set of conditions used in the wrapping approach may not be powerful or flexible enough for some problems.

Another approach, which is specific to extracting information from invoices, extracts consecutive lines that share similar token structure. Similarity is measured by token content (numerical/alphabetic/alphanumeric) as well as by token alignment. In this approach, 'main lines' are identified as text lines containing a real number (which usually corresponds to the price). Projection profiles on the main lines are then used to find columns. Periodicity structure of the main lines is used to assign the invoice to one of several predefined types.

In yet another approach, which is again specific to extracting information from invoices, similar ideas as the previous approach are used. According to this approach, a database of known invoice structures is used to extract structure from invoices of familiar types and token alignment is used as a cue to identify repeated structure in unfamiliar invoices.

Although some of the approaches described above are used in practice, it is desirable to extend their range of applicability. Namely, most of the current approaches assume fields are organized in widely separated columns and that no interlacing is present. Further, most current approaches assume records are periodic (i.e., the heights of line items are equal). As a result, when these assumptions fail, documents cannot be processed.

One reason for these limitations is that the cues used for making the decisions are relatively weak. For example, while the alignment of different fields may indicate a match, it is by no means a guarantee of a match (because non-matching fields are often aligned by accident, while matching fields may occasionally be misaligned). Another reason is that the decision function used to integrate the cues is often ad-hoc, relying on a series of thresholds to select a set of matches. Using hard thresholds is particularly problematic since, as mentioned above, any single cue might fail for a particular document.

The present disclosure contemplates new and improved systems and/or methods for document image analysis, including systems and/or methods that remedy these and other problems.

INCORPORATION BY REFERENCE

U.S. patent application Ser. No. 13/022,952 for "System and Method for Efficient Interpretation of Natural Images and Document Images in Terms of Objects and Their Parts," by Bart et al., filed on even date herewith, is hereby incorporated herein by reference in its entirety.

BRIEF DESCRIPTION

Various details of the present disclosure are hereinafter summarized to provide a basic understanding. This summary is not an extensive overview of the disclosure and is intended neither to identify certain elements of the disclosure, nor to delineate the scope thereof. Rather, the primary purpose of the summary is to present certain concepts of the disclosure in a simplified form prior to the more detailed description that is presented hereinafter. Most of the discussion will focus on the case of invoice parsing, wherein the structure repeats within a single page of the document. It is to be appreciated that the proposed methods are equally applicable to other document types, including those where the structure repeats over multiple pages.

According to one aspect of the present disclosure, a method for finding repeated structure for data extraction from document images is provided. A reference record and one or more reference fields thereof are identified from a document image. One or more candidate fields are generated for each of the reference fields and one or more candidate records are generated from the candidate fields. Note that candidate record generation is not exhaustive; only as many records as necessary to find the optima are generated. One or more best candidate records from the candidate records are selected using a probabilistic model and an optimal record set is determined from the best candidate records.

According to another aspect of the present disclosure, a document processing system for finding repeated structure for data extraction from document images is provided. The system includes an imaging device and/or a document conversion system and a data extraction system. The imaging device and/or the document conversion system convert documents, paper, electronic or otherwise, into document images, and the data extraction system extracts repeated structure from document images using a probabilistic model for cue integration.

According to another aspect of the present disclosure, a system for finding repeated structure for data extraction from document images is provided. The system includes a non-transient computer readable medium having computer executable instructions. These instructions identify a reference record and one or more reference fields thereof, from a document image; generate one or more candidate fields for each of the reference fields; find one or more best candidate records from the candidate fields using a probabilistic model; and determine an optimal record set from the best candidate records. The system further includes one or more processors that execute the computer executable instructions to find repeated structure in document images.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure will be set forth in the following detailed description of the disclosure when considered in conjunction with the drawings, in which:

FIG. 2 illustrates a display having a document image of an invoice;

DETAILED DESCRIPTION

Figure 1:
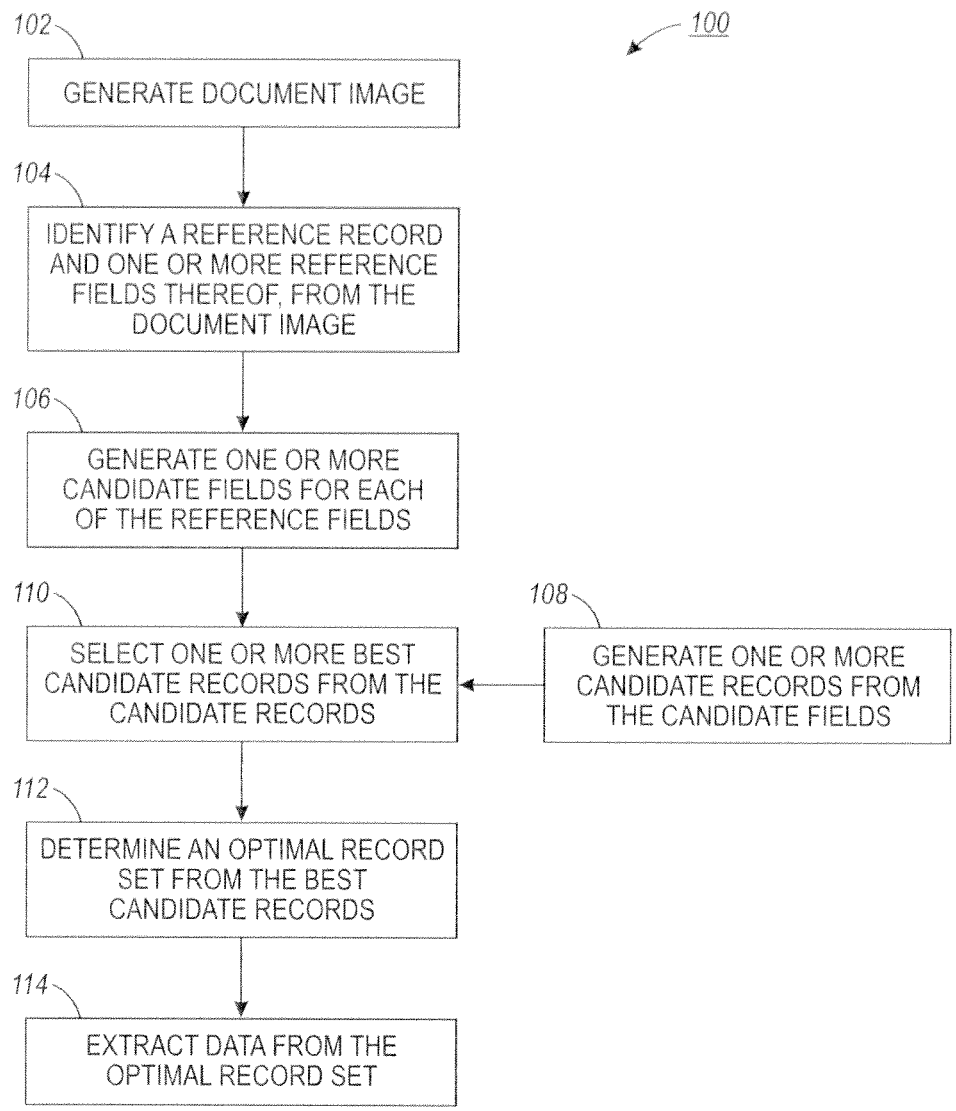
FIG. 1 illustrates a method of extracting repeated structure within a page of a document according to the present disclosure.

One or more embodiments or implementations are hereinafter described in conjunction with the drawings, where like reference numerals are used to refer to like elements throughout, and where the various features are not necessarily drawn to scale. It is to be appreciated that while the descriptions center on the case of finding repeated structure within one page of a document, the same methods apply equally to finding repeated structure within multiple pages of a document and within and/or across multiple documents.

1.0 Overview

Repetition of structure is prevalent in documents. In document design, such repetition conveys the underlying logical and function structure of the data. For example, in invoices, the names, unit prices, quantities and other descriptors of every line item are arranged in consistent spatial structure. Disclosed herein, methods and systems employing the same provide a general approach to extracting such repeated structure from documents. The structural similarity may be measured by a wide variety of perceptually motivated cues, such as alignment and saliency. These cues may then be combined in a probabilistic model, and repeated structure instances are found by applying a novel algorithm for exact probabilistic inference in this model.

2.0 The Basic Approach

With reference to FIG. 1, a method 100 of extracting repeated structure within a page of a document is illustrated. The document may be an invoice, a receipt, a healthcare document, or other documents or sets of documents having repeated structure therein. The method 100 may include generating 102 a document image, identifying 104 a reference record and one or more reference fields thereof, from the document image, generating 106 one or more candidate fields (or candidate matches) for each of the reference fields, selecting 110 one or more best candidate records from the candidate records (using a routine for generating candidate records from the candidate fields 108), determining 112 an optimal record set from the best candidate records, and extracting 114 data from the optimal record set. Note that the probabilistic model used in step 110 needs to be pre-trained for this process. This pre-training is described below.

The generation 102 of the document image may include converting the original incoming document representation into image form. If the original documents are hard (paper) copies, this image form can be generated using one or more of a camera, scanner, imaging device, and the like, as needed. In case the original documents are electronic (for example, in PDF format), the image form may be generated by converting it suitably to an image format. In this case, some information from the original document may be extracted and preserved for future use, in addition to the image itself. This may include, for example, the text content (if available electronically), which may subsequently be used directly instead of performing OCR on the image. The generation 102 of the document image may further include initially processing the document image. The initial processing may include deskewing, thresholding, and the like.

The identification 104 of a reference record and one or more reference fields thereof, from the document image, may include automatically identifying the reference record and the one or more reference fields. However, suitably the identification 104 includes receiving annotations from a user of the method 100. Also note that the record and field identification may happen in a batch mode in a separate step. In this case, the user performs this identification ahead of time, and at run time the system simply retrieves the previously annotated record, for example, from a disk drive or from a network. Even more, it is to be appreciated that although most of the discussions below consider only one example of each field being identified (called the 'one-shot' case), using additional examples is readily possible, using standard techniques from computer vision and machine learning, and may be advantageous in certain applications.

For user-based identification, the user may be presented with the document image via a display. The display may, for example, include one or more of a computer display, a projector, a LCD, a plasma display, and the like. Upon being presented with the document image, the user suitably identifies a record and its corresponding fields via the user input device. However, in other embodiments, the user may only identify a record via the user input device. In such embodiments, the identification 104 may further include identifying the individual fields of the identified record automatically. The user input device may include one or more of a mouse, keyboard, button, a dial, a touch-screen, and the like.

To identify the record and/or its corresponding fields, the user may draw one or more bounding boxes around the record and/or the fields using the user input device. In some of such embodiments, the bounding boxes may automatically snap to tokens to avoid the need for the user to precisely control the drawing. Alternatively, or additionally, the user may select tokens belonging to each field instead of drawing bounding boxes via the user input device. In embodiments involving tokens, the identification 104 may further include extracting tokens using optical character recognition (OCR) or using tokens extracted directly from the original electronic document, if available. Tokens usually correspond to individual words and/or characters.

With reference to FIG. 2, a display 200 displaying a document image 202 of an invoice is provided. The document image 202 includes a plurality of records 204, where the records includes a plurality of fields 206. As shown, a user annotated the document image 202 by drawing bounding boxes 208 around one of the records 204*a* and its corresponding fields. Note that the record bounding box 208*b* is not necessary in this case since it can be inferred automatically from the field bounding boxes.

Referring back to FIG. 1, in certain embodiments, the identification 104 may further include attempting to identify a document type of the document image before the user annotates the document image. In such embodiments, if the document type is identified, then annotations from the user may not be needed. In this manner, if many similar document images with identical layouts need to be processed only one of these document images may need to be annotated.

The generation 106 of one or more candidate fields (or candidate matches) for each of the reference fields may include extracting tokens from the document image and generating all contiguous blocks of the tokens. As noted above, the tokens may be extracted by OCR (which also gives their text content) or from the original electronic document, and usually correspond to individual words or characters. It is advantageous to generate all contiguous blocks of the tokens because fields in document images generally consist of multiple words and/or span multiple text lines, whereby good matches for a reference field generally consist of multiple tokens. These contiguous blocks may then be used as an initial pool of candidate fields for each of the reference fields.

While this initial pool could be used as the set of candidate fields for each of the reference fields, there are many (sometimes tens of thousands) candidate fields in this pool and considering all of them would be time-consuming. Therefore, in certain embodiments, the generation 106 may further include, for each reference field, discarding all candidate fields that are unlikely to participate in a good match with the corresponding reference field. This filtering process produces a much shorter list of candidate fields (e.g., between 20 and 200) for each reference field, which, as should be appreciated, will generally be different for each reference field.

So as to perform this filtering, a probabilistic model, described below, may be employed to evaluate the likelihood of potential matches. However, it is to be appreciated that other heuristics (for example, filtering candidate fields by size) may be also used as appropriate. The probabilistic model may include features that measure how likely a given candidate field B is to match the corresponding reference field R. The values of these features (denoted $f_s(B, R)$) may be computed for each candidate field B and candidate fields with scores less than a threshold may be removed from the candidate list.

The thresholds may be learned in a training stage and depend on $f_s(B, R)$, as well as on $f_s(R, R)$ (the corresponding feature value computed for the reference field R itself). The latter dependency is useful for features that measure a field's perceptual coherence. For example, most fields do not contain large whitespace gaps, whereby a candidate field with such a gap is unlikely to be a good match and can be discarded. However, if the reference field itself contains a large gap, then it becomes plausible that a candidate field might contain a gap as well. Candidate fields with large gaps are therefore no longer considered unlikely and need not be removed.

The generation 108 of one or more candidate records from the candidate fields suitably includes generating each possible combination of the candidate fields discussed above, in an order suitable for the selection 110. Put another way, the generation 108 suitably includes generating records that can be derived from the candidate fields previously determined. Note again that this generation is not exhaustive; rather, candidate records are generated on demand and in an order suitable for the selection 110.

The selection 110 of the one or more best candidate records from the candidate records may include finding candidate records having a best match quality with the reference record. Suitably, match quality is assessed using a probabilistic model, but other means of assessing match quality are equally amenable.

To assess a match quality of a candidate record using a probabilistic model, denote the n reference fields of a reference record R by the sequence $\{R_i\}_{i=1}^{n}$, and denote the n candidate fields (one candidate field for each reference field) of a candidate record B by the sequence $\{B_i\}_{i=1}^{n}$, where a candidate field for a reference field $R_i$ is denoted $B_i$. The match quality of a candidate record may then be evaluated by modeling the class conditional probability of the match, $$p(\{B_i\}_{i=1}^{n},\{R_i\}_{i=1}^{n}|C) \quad (1)$$

The class variable C may take on two values: 'match', or M, and 'no match', or $\overline{M}$.

For efficiency, the following specialized form of the model may be employed:

$$p(\{B_i\}_{i=1}^n, \{R_i\}_{i=1}^n \mid C) = \prod_{i \in [1...n]} s(B_i, R_i \mid C) * \prod_{\substack{i,j \in [1...n] \\ i \neq j}} d(B_i, B_j, R_i, R_j \mid C) * a(\{B_i\}_{i=1}^n, \{R_i\}_{i=1}^n \mid C). \quad (2)$$

However, in other embodiments, additional terms may be incorporated. For example, terms that involve three candidate fields may be useful to incorporate relations such as in between'.

s( ) models the probability that a candidate field $B_i$ matches a corresponding reference field $R_i$ (s stands for 'single-field criterion'); d( ) models the probability that a pair of candidate fields $B_i$, $B_j$ match a corresponding pair of reference fields $R_i$, $R_j$ (d stands for 'double-field criterion'); and a( ) models the overall match quality not modeled by the previous terms (a stands for 'all-field criterion').

The terms s( ), d( ), and a( ) may be modeled using the naive Bayes assumption, where features indicating presence or absence of a match are extracted and modeled as conditionally independent given the class. Although the naive Bayes assumption usually does not hold in practice, it often gives good results. Nonetheless, more sophisticated methods that incorporate dependencies may alternatively be employed.

Different kinds of features may be extracted for different terms of the model above according to the purpose of the terms. As will be seen, many features in the embodiments described herein are motivated by human perception. Namely, since documents are intended for interpretation by humans, it is natural to use perceptual cues to assess the match quality and coherence of candidate fields. But note that other types of features may be used as well.

The s( ) terms in the embodiments described herein embodiment measure the perceptual coherence of candidate fields and assess how well each candidate field $B_i$ matches the corresponding reference field $R_i$. To compute $s(B_i, R_i|C)$, one or more of the following features may be extracted.

Basic Similarity: Standard features, such as alignment, absolute position on the page, height/width similarity, and the like, may be computed. Alignment can be computed as the difference (in pixels) in the position of the left, right, or the middle of the reference field and the candidate field. This difference may be normalized to account for scale, for example, by dividing it by the average text height in pixels. Height and width features refer to differences in height and width, respectively, between the reference and candidate fields, possibly also normalized. Additional features may be used as needed by each application and may include text similarity and content type (e.g. character/numeric/alphanumeric).

Separation: The distance from the left edge of $B_i$ to the nearest horizontally overlapping token to the left may be computed. The purpose of this feature is to measure how perceptually salient $B_i$ is as a separate entity. If this distance is small, then B, is not perceptually salient, because it almost blends with another token. Since documents are designed for easy human perception, they are less likely to contain such a field, and its quality as a potential match may therefore be reduced. Similarly, features for separation to the right, top, and bottom may be computed. Again, these features may be normalized for scale.

Gaps: The size of the largest horizontal gap between neighboring tokens on the same text line within the candidate field may be computed. The idea is perceptual coherence. Normally, words are placed relatively close to each other on the same text line. A large gap might suggest that $B_i$ is in fact not a single field, but a union of several fields, and therefore a poor match. If more than one text line is present, the largest vertical gap may also be computed. Other features measuring compliance with standard typographic conventions may be used as well.

Line Breaks: For each text line except the last, the distance from the right edge of the rightmost token on that line to the right edge of $B_i$ may be computed. The idea is to measure coherence of $B_i$. Normally, as much text as possible without overflowing is fitted on each text line, and line breaks are avoided unless the next word does not fit on the current line. Therefore, a large gap suggests that $B_i$ is not very coherent and may consist of several fields. Alternatively, the trailing whitespace width in a given line may be compared to the width of the first word on the subsequent line. If that word could fit on the previous line, a penalty could be incurred.

Note also that in the exemplary embodiments described here, the same features are computed for all fields; in other words, the same function $s(B_i, R_i|C)$ is used for all fields i. In other embodiments, a set of functions $s_i(B_i, R_i|C)$ could be used instead. Each function $s_i$ could use a different set of features, as needed. This could be useful if different features are important for different fields. For example, if certain fields are known to be aligned on the left, while others are known to be aligned on the right, this method could allow assignment of high priority to left alignment and low priority to right alignment to the first set of fields, and a low priority to left alignment and a high priority to right alignment to the second set of fields. This approach has been tested as well and achieves good performance with suitable data.

The d( ) terms in the embodiments described herein are used to determine whether the spatial relations between two candidate fields $B_i$ and $B_j$ match the spatial relations between the corresponding reference fields $R_i$ and $R_j$. In other applications, additional features may be used. For example, suppose it is known that a certain field represents a date. Dates can occur in multiple formats, for example, "mm/dd/yy" or "mm.dd.yyyy". All of these formats are possible in general, but within a single document, a single consistent format is usually used. In this case, d( ) could include terms that measure consistency of the format. In the current embodiment, one or more of the following features may be extracted to compute $d(B_i, B_j, R_i, R_j)$.

Offsets: The difference of the distances between the left edges of $B_i$ and $B_j$ and the left edges of $R_i$ and $R_j$ may be computed. The distance between the left edges of two fields measures the horizontal offset of one field with respect to another. This feature therefore measures how different the offset between $B_i$ and $B_j$ is from the offset between $R_i$ and $R_j$. Similarly, the offsets of the centers and right edges may be computed, as well as vertical offsets of top, middle and bottom lines. These features may be normalized to scale as above.

Unexplained Text: Let R be the minimal bounding box that includes $R_i$ and $R_j$, and B be the minimal bounding box that includes $B_i$ and $B_j$. If R contains text tokens beyond those included in $R_i$ and $R_j$, then this feature has a value of zero. Otherwise (if all text in R is either in $R_i$ or in $R_j$), it is expected that B contains no additional text except the text in $B_i$ and $B_j$.

The value of this feature is then the area (in pixels) of such text contained in B. This feature may be normalized to scale by dividing by the square of the average text height in the document.

Note that as with the s( ) terms, the d( ) terms could also be pair-specific. In other words, instead of using the same function d( ) for every pair of fields (i, j), a pair-specific function $d_{ij}( )$ could be used for each pair.

Finally, the a( ) term provides the overall assessment of the match quality between the candidate record and the reference record. One or more of the following features may be used to compute a( ):

Intersection: A candidate record where some fields intersect is penalized.

Unexplained Text: The total area (in pixels) of unexplained text in the bounding box B, which is the minimal bounding box that includes all $B_i$'s. Unexplained text refers to text tokens inside B that do not belong to any $B_i$. This feature may be normalized to scale as above.

Note that unexplained text features appear in the d( ) terms as well as in the a( ) term. The a( ) version of this feature directly measures the total amount of unexplained text contained within a candidate record. The d( ) version is therefore redundant. Nevertheless, it is used to help optimization, as described below.

It is to be appreciated that additional features may be used in one or more of the terms described above. In particular, incorporating more perceptual cues may be used. In addition, a wide array of features that characterize appearance of each field may be used. These may include font characteristics (e.g., face, size, weight, slant, etc.), color, texture measures, and the like.

As mentioned above, the terms s( ), d( ), and a( ) may be modeled using the naive Bayes assumption. The log-likelihood ratio can in this case be expressed as $$L(\{B\}_{i=1}^n) = \log \frac{p(\{B_i\}_{i=1}^n, \{R_i\}_{i=1}^n \mid M)}{p(\{B_i\}_{i=1}^n, \{R_i\}_{i=1}^n \mid \overline{M})} \quad (3)$$

$$= \sum_{i \in [1...n]} \sum_k w_k^s [f_k^s(B_i, R_i)] +$$

$$\sum_{\substack{i,j \in [1...n] \\ i \neq j}} \sum_k w_k^d [f_k^d(B_i, B_j, R_i, R_j)] +$$

$$\sum_k w_k^a [f_k^a(\{B_i\}_{i=1}^n, \{R_i\}_{i=1}^n)],$$

where $w_k^s$, is the weight of the s( ) feature k, and $w_k^d$ and $w_k^a$ are similar weights for the d( ) and a( ) features, respectively. These weights are learned from training data, as described below.

To find candidate records having a best match quality, a search algorithm called best-first leaf search (BFLS) is suitably employed to find candidate records that maximize an objective function, such as the objective function L described above in connection with the probabilistic model. However, other search algorithms such as A* and Gibbs sampling may be employed.

BFLS uses an upper bound on the objective function and examines candidate records in the order of decreasing upper bounds. Once a candidate record whose match quality is above the next-best upper bound is found, the search can safely terminate since the remaining candidate records are guaranteed to have worse upper bounds and therefore also worse match qualities. The main requirement of BFLS is that the upper bound be factorizable into terms, each of which only involves one candidate field.

Applying BFLS to the probabilistic model described above, an example of a factorizable upper bound is $$U(\{B_i\}_{i=1}^n) = \sum_{i \in [1...n]} w_k^s [f_k^s(B_i, R_i)]. \quad (4)$$

This upper bound is a proper upper bound only if the weights $w_k^d$ and $w_k^a$ are non-positive. Namely, most features used for d( ) and a( ) measure discrepancies between an 'ideal' field and the candidate field. Large feature values then correspond to large discrepancies and are therefore expected to be much more common in poorly matching candidate fields, as compared to good candidate fields. This implies negative weights for at least large feature values. However, in practice, some weights may be positive, especially for small feature values.

To compensate for positive weights, the largest weight for each feature may be subtracted from all weights for that feature, making all weights non-positive. This is possible since all features have finitely many possible values (e.g., 100). Subtracting the maximum weight from each feature only changes L by a constant, which is irrelevant since it is only used to find a maximum.

While the upper bound in equation (4) may be employed, it is not very tight. The reason is that it involves only the factors matching appearance of a single candidate field to a single reference field, using features such as alignment. A typical document contains many candidate fields that are aligned with any reference field. Most records composed of these fields will not form a coherent match due to, for example, violation of relative locations structure. But since relative locations do not influence the upper bound, many poor candidates will have a promising (high) value of U and therefore will be considered by the algorithm. This leads to inefficient search.

To overcome this inefficiency, BFLS may alternatively be applied to the probabilistic model as follows. First, assume that a candidate field for one of the reference fields (say $R_p$) is fixed to be $B_p$. This reference field is hereafter referred to as a pivot field p. A new upper bound $U^p$ may then be defined as $$U^p(\{B_i\}_{i=1}^n) = \sum_{i \neq p} \sum_k w_k^s [f_k^s(B_i, R_i)] + \quad (5)$$

$$\sum_{i \neq p} \sum_k w_k^d [f_k^d(B_i, B_p, R_i, R_p)] + \sum_{j \neq p} \sum_k w_k^d [f_k^d(B_p, B_j, R_p, R_j)].$$

Since $B_p$ is fixed, each of the $w_k^d$ terms depends only on one of the candidate fields and this upper bound is factorizable.

$U^p$ is tighter than the bound in equation (4), since $U^p$ includes terms that measure the quality of the spatial relations (and other features in d( )) involving the pivot field p. It is therefore expected that the search problem with the pivot field p held fixed can be solved more efficiently. Further, since $U^p$ involves the d( ) terms, the solutions which contain unexplained text will be penalized by it, even though the a( ) terms are not included in $U^p$. This also improves the efficiency of search.

In view of $U^p$, the following modified search algorithm may be employed. One of the reference fields may be selected as the pivot field. Each candidate field for that reference field may then be considered in turn as a possible fixed match. For each fixed match, the reduced problem is constructed and optimized using BFLS with the modified upper bound $U^p$. Since an optimization problem needs to be solved for every candidate match of the pivot field, it is natural to select as the pivot field the reference field with the fewest candidate fields. This modification of BFLS is called pBFLS, for 'pivoted BFLS'.

Using pBFLS, a predetermined number, such as N=10, of the best candidate records may be selected for each candidate field of the pivot field. If there are P candidate fields of the pivot field, the final set of best candidate records has a size of NP.

The determination 112 of the optimal record set from the best candidate records may include generating one or more candidate record sets from the best candidate records and selecting the best candidate record set from the candidate record sets. A document, such as an invoice, may contain multiple instances of the repeated structure. All such instances may need to be identified. The set of all instances of repeated structure forms a 'record set'. In the current embodiment, the optimal record set may not include overlapping records and suitably accounts for more tokens than any other candidate record set. Further, of all candidate record sets that account for the same number of tokens, the set which has the highest overall quality of individual records (as measured by the sum of all the L scores) may be selected. In other embodiments, the optimality criteria may be suitably different to account for the target application.

To generate the candidate record sets, every combination of the best candidate records may be enumerated. However, in embodiments employing pBFLS, the candidate record sets may be generated by enumerating every combination of the best candidate records having zero or one best candidate records for each of the fixed matches of the pivot field. Suitably, this prevents some candidate record sets having intersection from being considered, since two candidate records with the same fixed pivot match will intersect at least at that fixed pivot match. Note that other intersections may still be possible even in this case, and should be checked for separately.

To select the optimal record set, a search of the candidate record sets may be performed. Suitably, this search is a brute-force search, but other means of searching may be employed. While searching the candidate record sets, candidate record sets having any intersections (i.e., fields that belong to multiple candidate records) are ignored. Further, the search suitably seeks the candidate record set explaining more tokens than any other candidate record set. To compute how much text is explained by a candidate record set, the area (in pixels) of all the tokens which do not belong to any field of any record in the candidate record set is computed. This text is called 'unexplained,' and the candidate record set which minimizes the area of unexplained text is selected. Further, the 'quality' of the record set is computed as the sum of the L values of all the records in the set. Of all candidate record sets with the minimal amount of unexplained text, the set with the best quality may suitably be selected.

The number of possible solution sets that need to be searched is the product of the numbers of candidate records for each pivot match. This number can become prohibitive, especially for large document images. Therefore, in certain embodiments, the determination 112 of the optimal record set may further include filtering the best candidate records to retain only the most promising candidate records before generating the candidate record sets and searching the candidate record sets.

A natural way to perform this filtering is by setting a threshold on the match quality, measured by the log-likelihood function L above. However, the number of terms in L depends on the number of reference fields. The range of variation of L is therefore different for problems with different numbers of reference fields: what is considered a high (good) value of L for a problem with ten reference fields may be a low (poor) value for a problem with only two reference fields. This makes selecting a single problem-independent threshold difficult.

To alleviate this problem, L can be modified to define L'. The idea is to include some of the information available in L, but to make the number of terms in L' independent of the number of reference fields. To achieve this, note that L involves three types of terms: the $f^c(\ )$ terms (those involving a single $B_i$), the $f^d(\ )$ terms (those involving two $B_i$'s), and the $f^a(\ )$ terms (those involving all $B_i$'s). Consider, for example, the $f^d(\ )$ terms. There are roughly $n^2$ combinations of two fields (recall that n is the number of reference fields). Therefore, there are roughly $n^2$ terms per feature. These terms provide information about how much the spatial relations of a candidate record are similar to the spatial relations of the reference record. Denote the vector of all values of a feature $f_k^d$ (for all pairs $B_i$, $B_j$, i≠j) by $F_k^d$. In L, all values in this vector are used, and since the length of $F_k^d$ depends on n, so does L. For L', therefore, $F_k^d$ may be characterized by a fixed number of values.

In certain embodiments, five evenly spaced percentile values may be employed to characterize $F_k^d$. Namely, the minimum, maximum, median, 25'th percentile and the 75'th percentile values may be used. These values provide rough information about how many spatial relations match well and how many match poorly, but without specific details about how well each particular spatial relation is matched. These features therefore provide less information than the full vector $F_k^d$. However, on the other hand, the number of these values is independent of n, and therefore they can be used consistently regardless of how many reference fields there are. Similarly, the vectors $F_k^s$ and $F_k^a$ may be created. If the objective function involves additional terms (say, relations among three fields), similar vectors can be created for each term. Again, the naive Bayes assumption is used to compute a modified log-likelihood ratio $L'(\{B_i\}_{i=1}^n)$ based on these percentile features.

The naive Bayes assumption is that the features are independent given the class value. This assumption is clearly violated for the percentiles of $F_k^a$. The reason is that $F_k^a$ has length one, since there is only one way to choose n fields out of n. Therefore, all percentiles have the same value, and clearly aren't independent, whereby in practice we only use one percentile value for $F_k^a$.

The percentiles of and $F_k^s$ and $F_k^d$ are not independent as well. For example, the maximum is never smaller than the minimum. Therefore, it is desirable to use a learning method which can cope with dependent features (such as SVM) to perform this final filtering. However, in the embodiments described herein the Naïve Bayes method is used and works well for our tasks.

In view of the foregoing, the filtering may include computing the value of L' for each candidate record and removing the candidate records whose L' value is less than a pre-determined threshold. Thereafter, the candidate records sets can be enumerated and searched, as described above.

To further speed up the search, the selection of the optimal record set may be done progressively. This works, for example, if there is some natural ordering of records. For example, in the case of invoices, the records correspond to line items and are typically ordered from top to bottom on the page. When pBFLS is used, this ordering is indicated by the relative y positions of the candidate pivot matches. In this case, the selection may proceed as follows. The topmost record is picked, and several (two in the embodiments described herein) additional records below it are added for context. An optimal configuration of this subset of records is selected, for example, using brute force with filtering, as above. Then the optimal candidate for the topmost record is retained, and the process repeats with the next set of records (i.e. records 2 through 4). Note that it is important to include overlap in this search. The reason is that although there is enough context to pick the optimal value for the top record reliably, there may not be enough context to pick the optimal values for the subsequent two records in the same batch.

The extraction 114 of data from the optimal record set is suitably accomplished by assigning each labeled field a semantic role and by extending this semantic role to other matching fields. In such embodiments, the records of the candidate record set may be extracted to a database and/or a spreadsheet, thereby allowing efficient storage and searching thereof. It should be appreciated that in some cases OCR need not be employed. For example, images of the records may be extracted from the document images.

Prior to applying the procedure outlined above, the models should be trained. The training of the probabilistic models with one or more annotated document images seeks to learn the parameters of the probabilistic models specified above. Specifically, the weights w used in L and L' need to be learned. In certain embodiments, the standard learning procedure for naive Bayes models may be used. In such embodiments, a training set of document images may be employed. In each document image, one or more records need to be annotated, as described above. Suitably, if other models are used, their parameters should be trained as well.

For the Naïve Bayes case, the weight w for a feature f may be learned as follows. The values of f are discretized and clipped at 0 and 99. For each discretized value $f_o$, the probabilities $p(f=f_o|M)$ and $=f_o|\overline{M})$ are estimated from the training data. The weight is then computed as $$w[f_o] = \log \frac{p(f = f_o | M)}{p(f = f_o | \overline{M})}. \quad (6)$$

In certain embodiments, the training may automatically deal with irrelevant features. Suitably, this is accomplished by assigning low weights and will not influence the methods disclosed herein. It is therefore possible to specify a wide variety of features without having to verify whether these features are useful for match finding.

Figure 3:
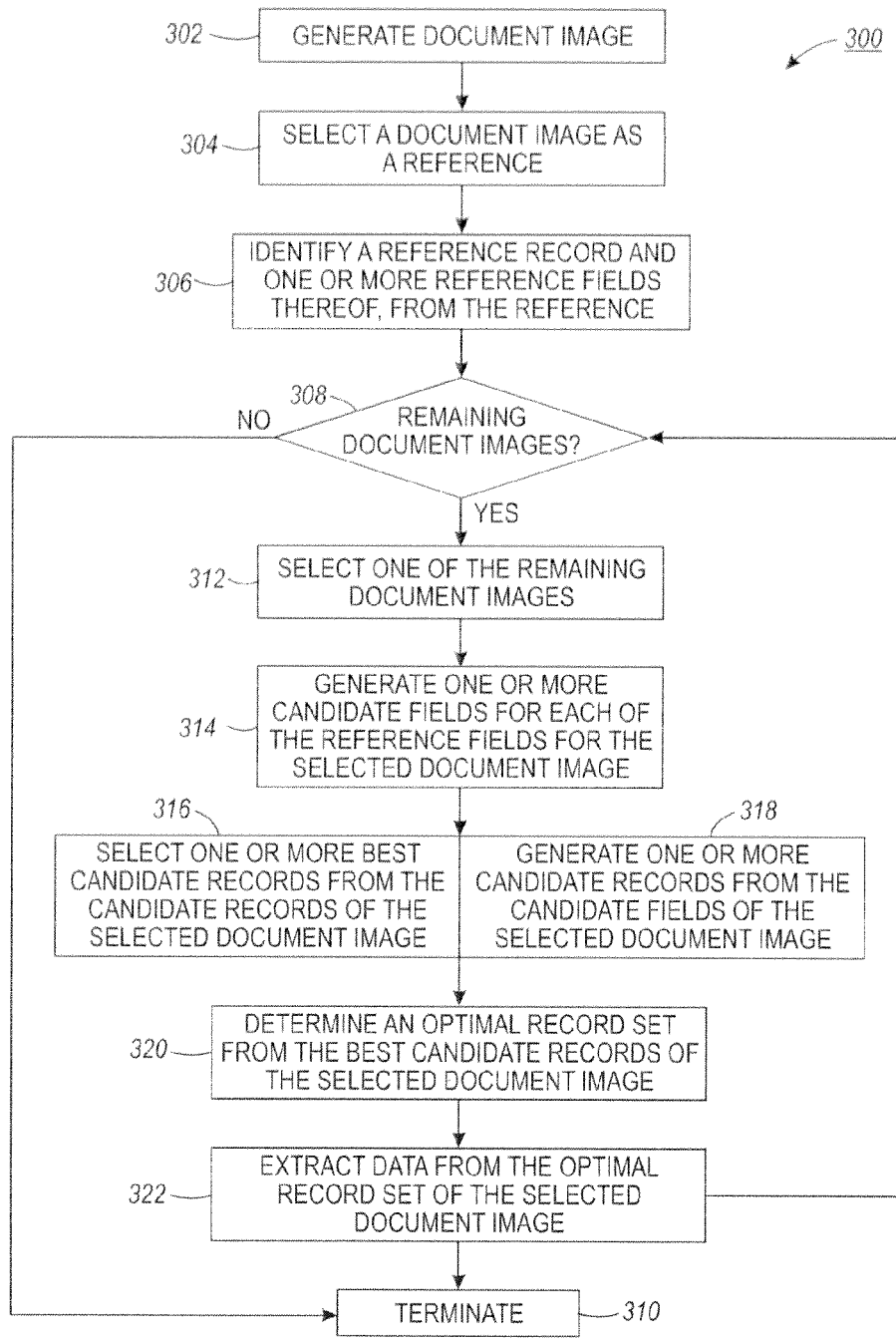
FIG. 3 illustrates a method of extracting repeated structure within and/or across pages of one and/or multiple documents according to the present disclosure.

With reference to FIG. 3, a method 300 of extracting repeated structure within and/or across one or more pages of one or more documents is illustrated. The documents may include one or more invoices, receipts, healthcare documents, and other documents or sets of documents having repeated structure therein (within and/or across pages of one and/or multiple documents). Further, each document includes one or more pages.

The method 300 includes generating 302 a document image for each page of the documents, as described above in connection with Action 102 of FIG. 1, and then selecting 304 one of the document images as a reference. Typically, it does not matter which of the document images is selected. A reference record and one or more reference fields thereof are then identified 306 within the reference, as described above in connection with Action 104 of FIG. 1. Upon identifying 306 the reference fields and the reference record, a determination 308 is made as to whether there are document images that need to be checked for repeated structure. Typically, this initially includes all of the document images, including the reference. However, insofar as the documents are known to only include a single record per page, the reference may be excluded from the check since all the records therein are known. If there are not document images that need to be checked (i.e., they have all been checked and/or the records in each of the document images are known), the method 300 terminates 310. If there are document images that need to be checked, one of these document images is selected 312.

One or more candidate fields for each of the reference fields are generated 314 for the selected document image. One or more best candidate records from the candidate records are then selected 316 using a routine for generating 318 candidate records from the candidate fields. An optimal record set is determined 320 from the best candidate records of the selected document and data is extracted 322 from the optimal record set of the selected document. Actions 308 through 322 are then repeated until all the document images are checked. Actions 314 through 322 are as described in connection with Actions 106 through 114 of FIG. 1, respectively.

3.0 System Implementation

Figure 4:
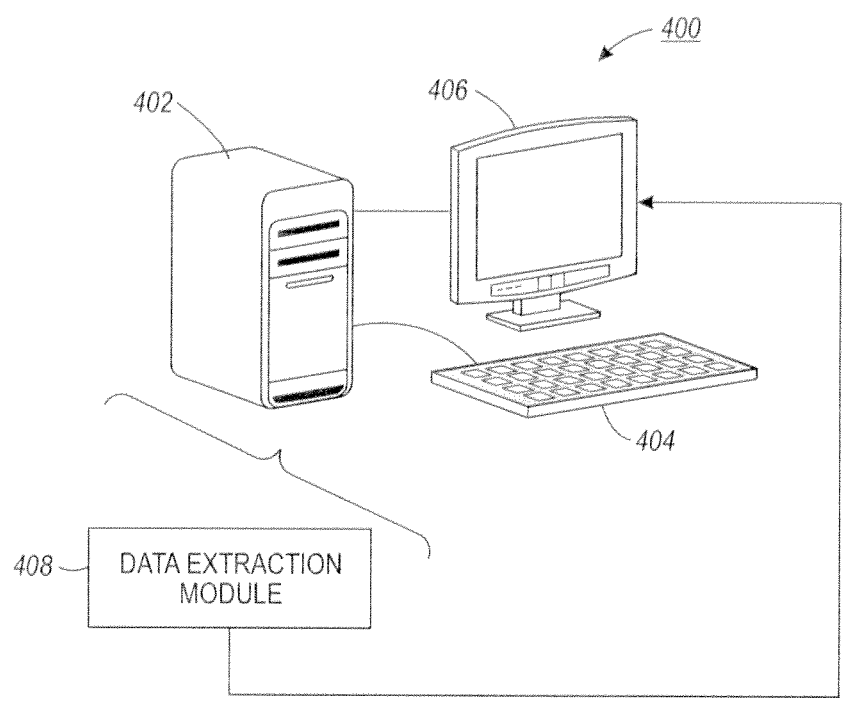
FIG. 4 illustrates a data extraction system according to the present disclosure; and, FIG. 5 illustrates a document processing system suitably employing a data extraction system of the present disclosure.

With reference to FIG. 4, a data extraction system 400 is provided. One or more computers or other digital/electronic processing devices 402, each including storage and a digital/electronic processor, such as a microprocessor, microcontroller, graphic processing unit (GPU), etc., suitably embody the system 400. However, in other embodiments, the system 400 may be embodied by one or more servers, each including a digital processor and each including or having access to digital data storage, such servers being suitably accessed via the Internet or a local area network, or by a personal data assistant (PDA) including a digital processor and digital data storage, or so forth.

The computers or other digital/electronic processing devices 402 suitably include or are operatively connected with one or more user input devices 404, such as a keyboard, mouse, touch screen, etc., for receiving user input to control the system 400. Further, the computers or other digital/electronic processing devices 402 suitably include or are operatively connected with one or more display devices 406, such as an LCD, a plasma display, a projector, etc., for displaying output generated by the system. In other embodiments, the input for controlling the system 400 is received from programs running on the computers or other digital/electronic processing devices 402, or from a network connection, or so forth. Similarly, in other embodiments the output may serve as input to a program running on the computers or other digital/electronic processing devices 402, or may be transmitted via a network connection, or so forth.

The system 400 suitably includes a data extraction module 408 that implements one or more aspects of the methods and/or algorithms disclosed herein. In certain embodiments, the module 408 receives one or more document images from a source external to the module 408 and detects repeated structure within the document images. In some of such embodiments, the module 408 further receives user annotations of one of the document images from a user of the system 402. Suitably, this is accomplished via the user input devices 404 or an external source, such as the network.

In some embodiments, the data extraction module 408 is embodied by a storage medium storing instructions executable by the computers or other digital/electronic processing devices 402. The storage medium may include, for example:

a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth.

Figure 5:
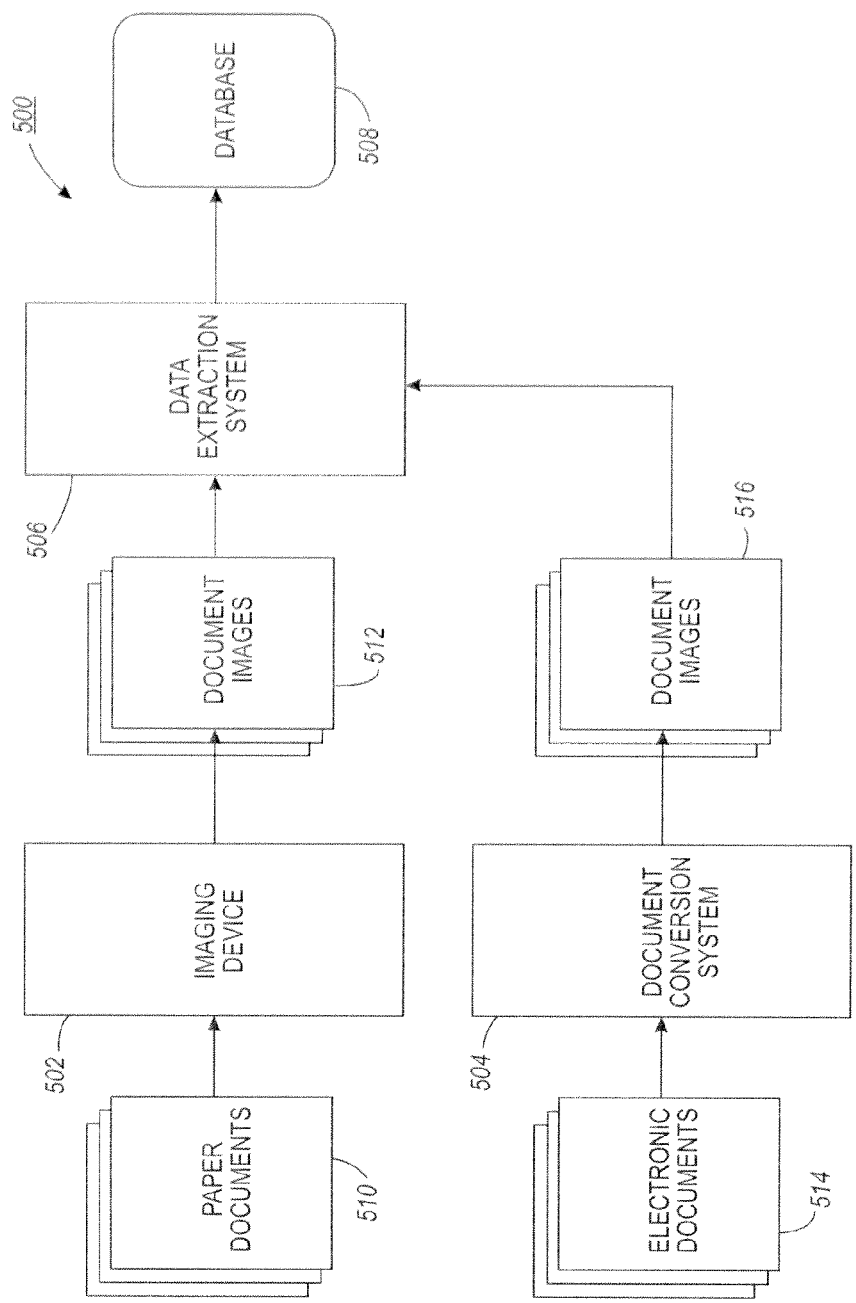

With reference to FIG. 5, a document processing system 500 employing a data extraction system is illustrated. The document processing system 500 may include an imaging device 502, a document conversion system 504, a data extraction system 506, such as the data extraction system 400 of FIG. 4, and a database 508. Notably, however, the document processing system 500 may only include one of the imaging device 502 and the document conversion system 504.

The imaging device 502 converts one or more paper documents 510 into document images 512. The imaging device 502 may be one or more of a camera, a scanner, and the like. In certain embodiments, the imaging device 502 may receive the paper documents 510 via a conveyor path extending from a feed tray. However, other means of receiving the paper documents 510 are equally amenable. For example, in certain embodiments, an operator of the document processing system 500 may feed the paper documents 510 to the imaging device 502.

The document conversion system 504 converts one or more electronic documents 514 into document images 516. Optionally, the document images 516 may include auxiliary data, such as the text content of the document 514. Put another way, the document conversion system 504 converts the electronic documents 514 in various electronic formats (such as PDF, XML, Word, etc.) into a standardized image format, possibly with auxiliary data. The electronic documents 514 may be loaded from a magnetic or optical media or a network.

The data extraction system 506 processes the document images 512, 516 to extract data contained therein according to methods and/or approach of the present disclosure. Suitably, the data extraction system 506 may receive the document images 512, 516 via a communications network, such as the Internet, a local area network, a wireless network, and the like. However, in other embodiments, the data extraction system 506 may receive the document images 512, 516 via a data bus, such as USB, Firewire, etc., a storage medium, such as a CD, a thumb drive, etc., and the like.

The database 508 stores records extracted from the document images 512, 516. Suitably, the database 508 receives the records from the data extraction system 506 via a communications network, such as the Internet, a local area network, a wireless network, and the like. In certain embodiments, the database 508 may be distributed across a plurality of computer servers interconnected by a communications network. The database 508 suitably stores the records in a table structure having fields corresponding to the fields of the records.

4.0 Experiments

The proposed systems and methods were trained on 10 synthetic invoice images. After that, they were tested on a dataset of 15 invoice types. This dataset consisted of scanned invoices from 15 different vendors with different invoice styles. Two to six invoices for each vendor were used, for a total of 51 invoices. Each invoice contained between 2 and 21 records (each record corresponds to a description of one product). The total number of records in all the invoices was 409. The number of fields per record varied between 4 and 11. One record per invoice was used for annotation. The remaining 358 records were used for testing the system.

Of these, 330 records (92%) were found successfully. A match was declared successful when all fields of a record were identified correctly. On the level of complete documents, a document was declared as processed successfully if all records were found successfully. In test dataset described above, 32 out of 51 invoices (63%) were processed successfully. In a production setting, these invoices would not need any further manual processing.

The most frequent mode of failure was the tendency of the specific embodiments disclosed herein to include spurious text within a match, even at the expense of match quality. The reason for this behavior is the requirement to explain as much of the document as possible, and the strong penalty for unexplained text. In other embodiments, this could be addressed by training on an appropriate training set which includes appropriately labeled examples including spurious text.

Some of the remaining errors are attributed to OCR. Most of these occur when OCR fails to recognize a token. Since candidate fields disclosed herein are constructed from tokens found by OCR, such an omission is not recoverable. Moreover, since the proposed methods cannot deal with missing fields, the entire record which contains the omitted field will not be found. It may be possible to remedy this by using connected sets of black pixels as an additional source of tokens.

Two additional experiments were performed to show the generality of the proposed methods. In one experiment, a set of photographed consumer receipts was used. In another, a set of scanned blood test result reports was used. No additional training was needed. The methods trained on the 10 synthetic invoices generalized well to these additional domains.

Further tests were performed with a variety of document types, including online store query results, medical claims forms, and others. Tests in which the repeated structure was found across multiple pages of the same document, as well as across multiple documents, were also performed. The performance of the proposed methods on these datasets was similar to the performance with invoices.

5.0 Conclusion

The present disclosure provides methods, and systems employing the same, for finding repeated structure in document images. The method may include generating a document image, identifying a reference record and one or more reference fields thereof, generating one or more candidate fields, generating one or more candidate records, selecting one or more best candidate records, determining an optimal record set, extracting data from the optimal record set, and training the probabilistic model.

A novel achievement of the methods is the ability to solve a wider range of problems than previously possible. Namely, the methods, after a brief training, can solve problems with document images from several different categories (such as invoices, receipts, and blood test forms). Previously, separate training was needed for each task. Additionally, the methods cover a broader range of documents in each category than previously possible. For example, they can handle cases when different columns overlap (leading to interlacing), when there is no clear separation between columns, and when different instances of repeated structure can occupy a different number of text lines.

One novel aspect of the methods is the use of a fully probabilistic formulation (as opposed to a set of ad-hoc rules). Namely, a single principled objective function is formulated and optimized. This provides greater flexibility and allows the methods to cope with more variability in the structure than previously possible. This also allows the methods to grade possible solutions continuously (as opposed to making hard decisions), which improves performance since more information is considered before irreversible decisions are made.

Another novel aspect is the use of a broader range of cues compared to previously described models. Especially novel is the use of perceptual cues and encouraging the methods to explain as much of a document image as possible. Perceptual cues used in previous approaches were limited to alignment and proximity, whereas the methods incorporate additional important cues, such as the presence of gaps, amount of whitespace, etc. These are especially helpful when the methods need to adapt to structures that occupy varying number of text lines.

Another important novelty is that the methods avoid using column structure as cue. This allows the methods to deal with document images where individual columns overlap (leading to interlacing). This is in contrast to most other invoice parsing methods which assume column structure. The only method which doesn't explicitly model column structure is the wrapping method. However, wrapping does not allow for automatic parsing of documents, as conditions for match in wrapping must be specified explicitly by the user.

Other novel aspects are that the methods use very elaborate spatial relations between fields and a novel optimization algorithm for efficiently searching the space of candidate matches. In contrast, previous approaches only used crude spatial relations data such as 'left/right/above/below'.

The performance of the methods was illustrated on examples from several different domains (including invoices, receipts, and medical documents). The methods cover a broader range of documents in each of these categories than was possible previously. In addition, the method adapts well to other repeated structure finding tasks, such as finding repeated structure in tables of contents or in search results.

The general need for human input is one of the main limitations of the methods. Human supervision is required at two stages: during training, when user-labeled training examples need to be supplied, and during processing, when the user annotates an example of the structure to be found. Nonetheless, the amount of training data needed by the methods is already quite small.

During experimentation, training on ten invoice images allowed the methods to successfully generalize novel invoices (from vendors not represented in the training set), as well as to receipts and medical forms. Further, in an experiment attempting to generalize an annotation from one invoice to additional invoices from the same vendor the performance was comparable to performance with annotations specifically made for each invoice. Since many companies receive most of their invoices from a small subset of vendors, the methods save significant annotation effort.

The disclosure has been made with reference to preferred embodiments. Obviously, modifications and alterations will occur to others upon reading and understanding the preceding detailed description. It is intended that the preferred embodiments be construed as including all such modifications and alterations insofar as they come within the scope of the appended claims or the equivalents thereof.

The invention claimed is:

1. A method for finding repeated structure for data extraction from document images, said method comprising:
identifying one or more reference records and one or more reference fields thereof, from one or more document images;
generating one or more candidate fields for each of the reference fields;
finding one or more best candidate records from the candidate fields using a probabilistic model, where the search is performed by one or more processors; and,
determining an optimal record set from the best candidate records.

2. The method of claim 1, wherein the identification of the reference record and the reference fields includes receiving user annotations of the document image, wherein the user annotations identify the reference record and/or the reference fields.

3. The method of claim 1, further comprising:
for each candidate field, measuring a likelihood of matching an associated reference field using a probabilistic model; and,
discarding candidate fields having a likelihood of matching an associated reference field below a threshold.

4. The method of claim 1, wherein the generation of the candidate fields includes:
for each candidate field, measuring a likelihood of matching an associated reference field using a set of heuristics, and,
discarding candidate fields having a likelihood of matching an associated reference field below a threshold.

5. The method of claim 1, where the match qualities of the records are determined using the probabilistic model, wherein the probabilistic model includes terms assessing a probability that a group of one or more fields of a candidate record match a corresponding group of one or more reference fields and/or a term assessing overall match quality of a candidate record to a reference record.

6. The method of claim 1, wherein the probabilistic model includes features that encourage explaining as much of the document image as possible.

7. The method of claim 1, wherein the probabilistic model includes features that measure perceptual coherence of fields.

8. The method of claim 7, wherein the features include one or more of separation, gaps, line breaks, and offsets.

9. The method of claim 7, wherein the features include one or more of similarity, unexplained text, and intersections.

10. The method of claim 1, wherein criteria for the determination of the optimal record set include selecting a set of records from the best candidate records that explain as much of the document image as possible.

11. The method of claim 1, wherein the determination of the optimal record set uses a second probabilistic model independent of the number of the reference fields to asses match quality of the best candidate records to the reference record.

12. The method of claim 1, wherein said method assumes no column structure in the document images.

13. The method of claim 1, further comprising:
training the probabilistic model with one or more annotated document images.

14. The method of claim 1, further comprising:
extracting data from the optimal record set, wherein the extracted data is stored in a database.

15. A document processing system for finding repeated structure for data extraction from document images, said system comprising:
an imaging device and/or a document conversion system that converts documents into document images; and,
a data extraction system that extracts repeated structure from document images using a probabilistic model for cue integration, wherein the data extraction system including one or more processors executing computer executable instructions stored on a non-transient computer readable medium that:
identify a reference record and one or more reference fields thereof, from a document image;
generate one or more candidate fields for each of the reference fields;

find one or more best candidate records from the candidate fields using the probabilistic model; and, determine an optimal record set from the best candidate records.

16. The document processing system of claim 15, further comprising:

a database, wherein said database stores data extracted by the data extraction system.

17. A system for finding repeated structure for data extraction from document images, said system comprising:

one or more non-transient computer readable mediums having computer executable instructions that:

identify a reference record and one or more reference fields thereof, from a document image;

generate one or more candidate fields for each of the reference fields;

find one or more best candidate records from the candidate fields using a probabilistic model; and, determine an optimal record set from the best candidate records; and, one or more processors that execute the computer executable instructions to find repeated structure in document images.

18. The system of claim 17, said system further comprising:

a user input device, wherein the identification of the reference record and the reference fields includes receiving user annotations of the document images from the user input device.

19. The system of claim 17, wherein the probabilistic model includes features that measure perceptual coherence of fields.

* * * * *